United States Patent
Lise et al.

(10) Patent No.: US 9,808,753 B2
(45) Date of Patent: Nov. 7, 2017

(54) SYSTEM AND METHOD FOR MAKING PLEATED FILTER MEDIA

(71) Applicant: 3M INNOVATIVE PROPERTIES COMPANY, St. Paul, MN (US)

(72) Inventors: Jonathan M. Lise, Woodbury, MN (US); Joel R. Slamkowski, Minneapolis, MN (US); Nader J. Barjesteh, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 677 days.

(21) Appl. No.: 14/177,900

(22) Filed: Feb. 11, 2014

(65) Prior Publication Data
US 2014/0235419 A1    Aug. 21, 2014

Related U.S. Application Data

(60) Provisional application No. 61/765,522, filed on Feb. 15, 2013.

(51) Int. Cl.
*B01D 46/00* (2006.01)
*B31D 5/00* (2017.01)
(Continued)

(52) U.S. Cl.
CPC ....... *B01D 46/0001* (2013.01); *B01D 29/012* (2013.01); *B01D 46/521* (2013.01); *B31D 5/0082* (2013.01)

(58) Field of Classification Search
CPC .. B01D 29/012; B01D 29/111; B01D 46/521; B01D 46/522; B01D 46/523;
(Continued)

(56) References Cited

U.S. PATENT DOCUMENTS

| 2,494,731 A * | 1/1950 | Vincent | D06C 7/00 |
| | | | 198/606 |
| 3,326,022 A * | 6/1967 | Drago | D06B 3/00 |
| | | | 68/5 D |

(Continued)

FOREIGN PATENT DOCUMENTS

KR    10-2007-0075764 A    7/2007

OTHER PUBLICATIONS

International Search Report for PCT/US2014/015828, prepared by the Korean Intellectual Property Office, dated May 27, 2014.

*Primary Examiner* — Stephen F Gerrity
*Assistant Examiner* — Joshua Kotis
(74) *Attorney, Agent, or Firm* — Kenneth B. Wood

(57) ABSTRACT

Systems and methods for automated fabrication of pleated filters that promote user-selected adjustment of the pleat spacing generated by the system. A lower conveyor of a pleat spacing station is operated at a selected conveyor rate. A gathered pleated segment of filter material is received at the pleat spacing station. The pleat spacing station expands a pleat spacing of the gathered pleated segment in forming a pleated filter segment. Expansion of the pleats at the pleat spacing station is accomplished by initially engaging the filter material along the lower conveyor, with the conveyor rate being alterable by a user, including on the fly alteration, to establish a desired pleat spacing and thus pleat density in the pleated filter.

20 Claims, 5 Drawing Sheets

(51) Int. Cl.
  *B01D 29/01* (2006.01)
  *B01D 46/52* (2006.01)
(58) Field of Classification Search
  CPC ............ B01D 46/0001; B01D 2201/12; B01D 2201/122; B01D 2201/125; B01D 2201/127; B31D 5/0082; B31D 5/04; B31F 1/24; B31F 1/242; B31F 1/245; B31F 1/32
  USPC ....... 493/941, 405, 430, 433–435, 463, 413, 493/415; 156/474; 55/DIG. 5
  See application file for complete search history.

(56) References Cited

U.S. PATENT DOCUMENTS

| | | | | |
|---|---|---|---|---|
| 3,903,806 | A | * | 9/1975 | Ayres ................ B66B 21/12 104/167 |
| 3,935,997 | A | * | 2/1976 | Loje .................... G06M 7/00 235/98 C |
| 3,959,056 | A | * | 5/1976 | Caplan ............... B31D 3/0284 126/690 |
| 4,012,932 | A | * | 3/1977 | Gewiss ............... B31D 5/0082 264/287 |
| 4,111,733 | A | * | 9/1978 | Periers ................ B31F 1/245 156/204 |
| 4,181,070 | A | | 1/1980 | Robbins et al. |
| 4,288,278 | A | * | 9/1981 | Akao ................. B01D 46/0001 156/204 |
| 4,594,162 | A | | 6/1986 | Berger |
| 4,610,379 | A | * | 9/1986 | Voisin ................... D06C 7/02 226/118.5 |
| 4,626,307 | A | | 12/1986 | Cherkas |
| 4,798,575 | A | | 1/1989 | Siversson |
| 4,917,277 | A | | 4/1990 | Hibbard |
| 4,976,677 | A | * | 12/1990 | Siversson ........... B01D 29/012 156/474 |
| 5,389,175 | A | | 2/1995 | Wenz |
| 5,586,964 | A | * | 12/1996 | Chase ................ B65H 45/1015 198/406 |
| 5,620,545 | A | * | 4/1997 | Braun ................... A62B 23/02 156/205 |
| 5,804,014 | A | * | 9/1998 | Kahler ................ B01D 29/012 156/204 |
| 5,868,889 | A | * | 2/1999 | Kahler ................ B01D 29/012 156/204 |
| 5,897,776 | A | * | 4/1999 | Mallabone .......... B01D 46/522 210/493.5 |
| 6,165,242 | A | * | 12/2000 | Choi ................... B01D 29/012 210/493.3 |
| 6,230,776 | B1 | * | 5/2001 | Choi ................... B01D 29/012 156/441 |
| 6,290,635 | B1 | * | 9/2001 | Demmel ............ B01D 46/0001 156/73.1 |
| 6,709,480 | B2 | | 3/2004 | Sundet et al. |
| 7,217,333 | B2 | | 5/2007 | Sundet et al. |
| 7,235,115 | B2 | | 6/2007 | Duffy et al. |
| 7,311,747 | B2 | | 12/2007 | Adamek et al. |
| 7,465,267 | B2 | * | 12/2008 | Goodrich .............. B31D 5/006 493/424 |
| 7,896,940 | B2 | | 3/2011 | Sundet et al. |
| 7,896,941 | B2 | * | 3/2011 | Choi ................... B01D 39/163 55/486 |
| 7,947,142 | B2 | | 5/2011 | Fox et al. |
| 8,142,538 | B2 | | 3/2012 | Sundet et al. |
| 8,231,700 | B2 | | 7/2012 | Sundet |
| 8,459,470 | B2 | * | 6/2013 | Weiss ................... C08F 255/00 210/500.21 |
| 2003/0066424 | A1 | * | 4/2003 | Shah ................. B01D 46/0004 95/273 |
| 2005/0139544 | A1 | | 6/2005 | Choi |
| 2005/0144916 | A1 | | 7/2005 | Adamek et al. |
| 2005/0204714 | A1 | * | 9/2005 | Sundet ............... B01D 46/0001 55/497 |
| 2006/0283162 | A1 | | 12/2006 | Dent et al. |
| 2007/0102101 | A1 | | 5/2007 | Spearin et al. |
| 2007/0251634 | A1 | | 11/2007 | Choi |
| 2010/0064491 | A1 | * | 3/2010 | Dumas ................ B01D 39/1623 28/100 |
| 2012/0272829 | A1 | | 11/2012 | Fox et al. |

* cited by examiner

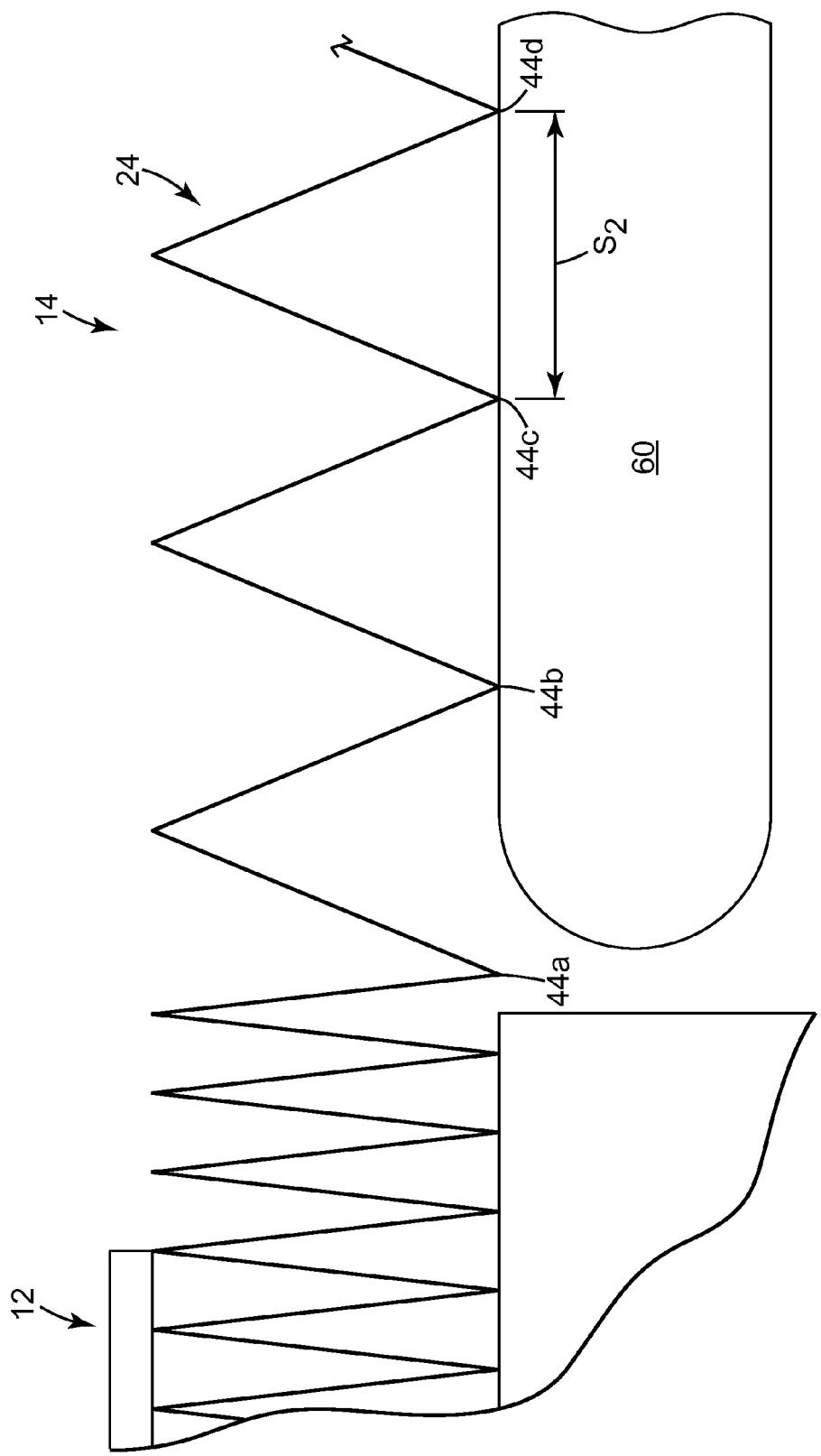

SYSTEM AND METHOD FOR MAKING PLEATED FILTER MEDIA

BACKGROUND

The present disclosure relates to pleated air filters. More particularly, it relates to systems and methods for fabricating pleated filters on a mass-production basis that promote user-selected adjustment of the pleat spacing generated by the system.

Pleated filters are commonly used in air filtration and other applications. In general terms, pleated filters include a filter media formed into an accordion-like or pleated structure. The pleated filter media is secured within a frame (e.g., a paperboard frame). Various retention members (e.g., metal screens, scrims, strips, etc.) are often applied to the pleated filter media to provide additional support and maintain an integrity of the pleats in the presence of various operating pressures.

The surface area of the pleated filter media is a major factor in determining flow resistance (i.e., pressure drop) and loading capacity of the pleated filter. The surface area of the pleated filter media, in turn, is determined by the size or outer dimensions of the pleated filter, the depth of the pleats, and the pleat density. Because the external dimensions of pleated filters are often restricted to a particular end-use application, the pleat density (often times expressed in terms of number of pleats per inch) is the primary variable available to manufactures when fabricating different pleated filter formats. Higher performing pleated filters generally have more pleats per inch, and lower cost filters have lower pleats per inch. As a point of reference, pleat density is directly related to the spacing established between adjacent pleats (or "pleat spacing").

Conventional automated methods of mass producing pleated filters include supplying a continuous web of the filter media to a pleating device. The pleating device folds the filter media at regular intervals, with the so-formed pleats being gathered in a relatively tight pack. The pleated filter media web is then processed through a pleat spacing device that adjusts and sets the pleats at a predetermined, uniform pleat spacing. For example, one conventional pleat spacing device conventionally employed in the automated fabrication of pleated filters is described in U.S. Pat. No. 4,976,677 (Siversson) and includes a helical screw conveyor in which the flight or pitch of the screw conveyor windings establishes the pleat spacing. Another well-known automated pleat spacer is described in U.S. Pat. No. 5,389,175 (Wenz) and U.S. Publication No. 2006/0283162 (Dent), and includes a conveyor having a plurality of spaced apart flites or cleats (e.g., a fixed pitch cleated conveyor). Individual ones of the flites or cleats carry or hold consecutive pleats during continuous movement of the conveyor, such that the resultant pleat spacing is dictated by the spacing between adjacent flites or cleats.

While automated pleat spacing devices are highly viable and well accepted, certain concerns may arise. With either helical screw or fixed pitch cleated conveyor pleat spacing devices, the pleat spacing imparted by the device is fixed and is not easily adjusted. For example, the pitch defined by the helical windings of the screw conveyor pleat spacing device is fixed. Thus, when a pleated filter having a pleat spacing differing from that provided by the currently in-use helical screw is desired, the current screw must be replaced with a different helical screw having the desired pitch. Similarly, the flites or cleats provided with a fixed pitch cleated conveyor are robustly mounted to the conveyor. In order to adjust the pleat spacing established by the cleated conveyor, production must be stopped, and the multiple flites or cleats manually adjusted to establish a new spacing.

In light of the above, a need exists for improved systems and methods for fabricating pleated filters that provide simplified adjustment of a pleat spacing effectuated by the system and method.

SUMMARY

Some aspects of the present disclosure relate to a method of forming a pleated filter media. The method includes operating a lower conveyor of a pleat spacing station at a selected conveyor rate. A gathered pleated segment of a web of filter material is received at the pleat spacing station. The gathered pleated segment has a plurality of pleats including a plurality of pleat tips and a plurality of pleat valleys. Further, the gathered pleated segment is arranged in a first configuration defined by a maximum first distance between adjacent pleat valleys. The plurality of pleat valleys are adjusted and set within the pleat spacing station into a second spaced configuration to form a pleated filter segment. The second spaced configuration is defined by a second distance between adjacent pleat valleys. In this regard, the second distance established by the pleat spacing station is greater than the first distance (of the gather pleated segment) and varies as a function of the selected conveyor rate. With methods of the present disclosure, then, the pleat spacing (and thus the pleat density) of the pleated filter media can be adjusted or selected by operating the conveyor(s) of the pleat spacing station at a desired rate. In other words, by changing the conveyor rate of the pleat spacing station conveyor(s), the pleat spacing and pleat density established in the pleated filter media can be altered.

In some embodiments, the gathered pleated segment is continuously supplied to the pleat spacing station, and the pleat spacing established by the pleat spacing station in the pleated filter media can be adjusted "on the fly" while the gathered pleated segment of filter material continues to be supplied to the pleat spacing station. In other embodiments, the pleat spacing station establishes the pleat spacing in the filter material by pulling the gathered pleated segment, and initially contacts the filter web only at the pleat valleys; the pleat spacing station does not insert a structure into or between the pleats as otherwise required by conventional helical screw or fixed pitch cleated conveyor pleat spacing devices. In yet other embodiments, the gathered pleated segment is formed at a pleating station from a generally planar segment of the web of filter material. The pleating station includes a conveyance apparatus for supplying the gathered pleated segment from the pleating station to the pleat spacing station. In this regard, the selected conveyor rate of the pleat spacing station is correlated with a conveyance rate of the pleating station conveyance apparatus.

BRIEF DESCRIPTION OF THE DRAWINGS

FIG. 4A illustrates the arrangement of FIG. 3 at a later point in time, including the pleat spacing station continuing to adjust the filter media to the second pleat spacing;

DETAILED DESCRIPTION

Embodiments of the present disclosure are directed toward pleated filters for air filtration, and methods of making the same on a mass production basis. The methods of the present disclosure provide for assembly of the pleated filter by an automated process at a high rate of manufacturing. The pleated filter of the present disclosure can be used with or without a reinforcing frame structure. The methods and systems for fabricating pleated filters of the present disclosure may utilize conventional filter media, electret media, or a variety of other media suitable for air filtration, such as for furnace applications.

Figure 1:
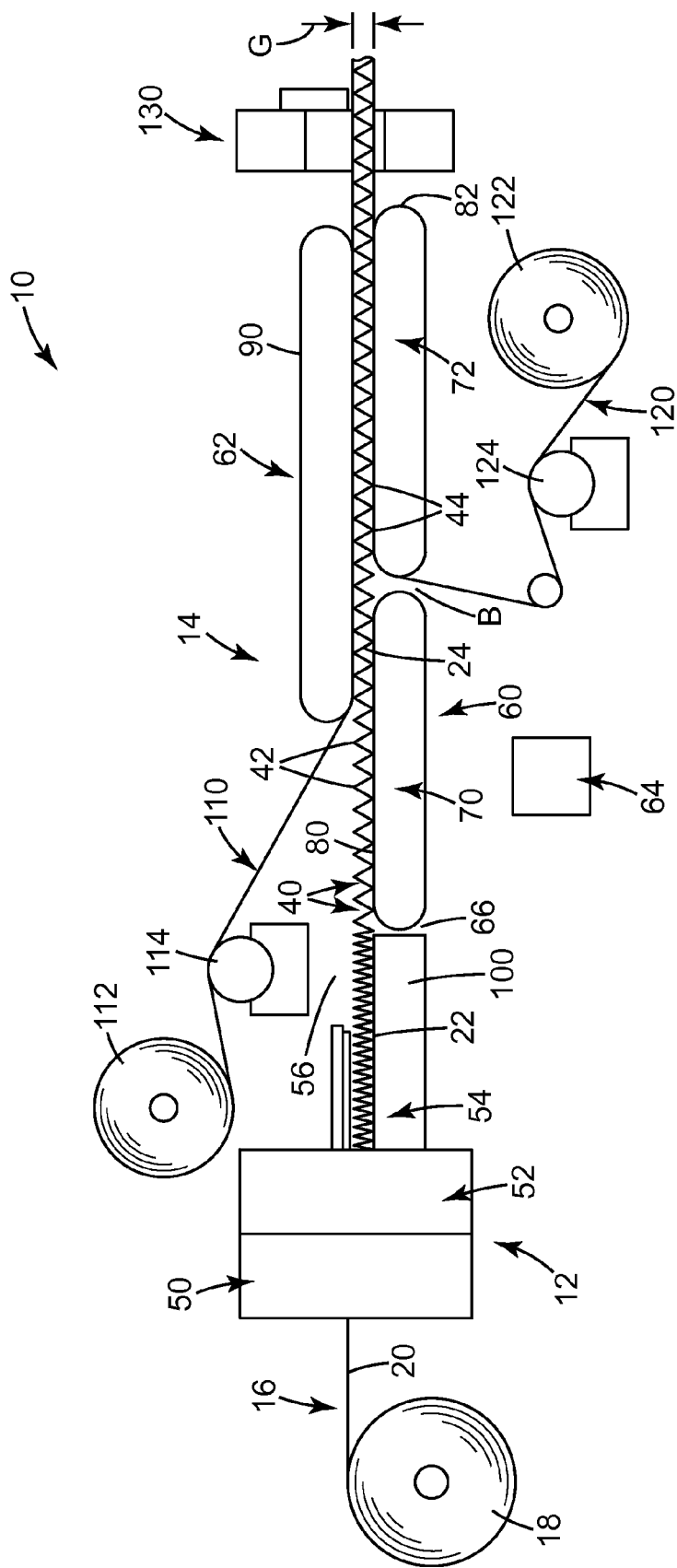
FIG. 1 is a schematic illustration of one embodiment of a system including a pleat spacing station for performing methods in accordance with principles of the present disclosure.

FIG. 1 is a schematic illustration of one embodiment of a system 10 for performing embodiments of methods of manufacture of the present disclosure. The system 10 includes a pleating station 12 and a pleat spacing station 14. A filter web or filter media 16 is supplied to the pleating station 12, and can be provided on a roll 18. In general terms, operation of the system 10 includes the pleating station 12 forming pleats in an initial, planar segment 20 of the filter media 16, with a gathered pleated segment 22 exiting the pleating station 12. The pleat spacing station 14 expands the gathered pleated segment 22, adjusting and setting a pleat spacing to produce a pleated filter segment 24. Where a single length or web of the filter media 16 is continuously supplied to and processed by the system 10, the continuous length of the filter media 16 can be viewed as having the initial planar segment 20, the intermediate gathered pleated segment 22, and the final pleated filter segment 24.

Figure 2A:
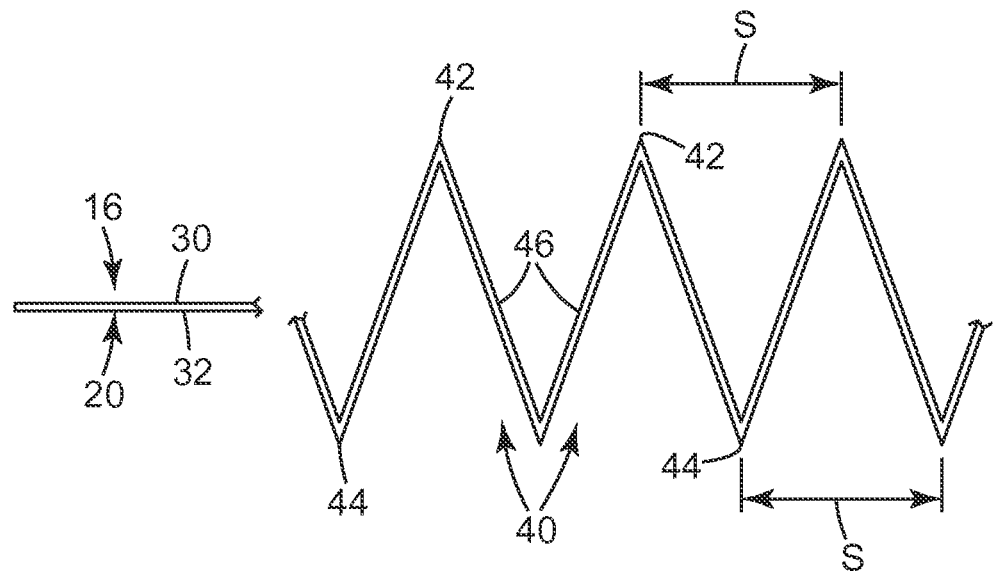
FIG. 2A is an enlarged side view of a filter media web and illustrating a pleats formed in the filter media.
Figure 2B:
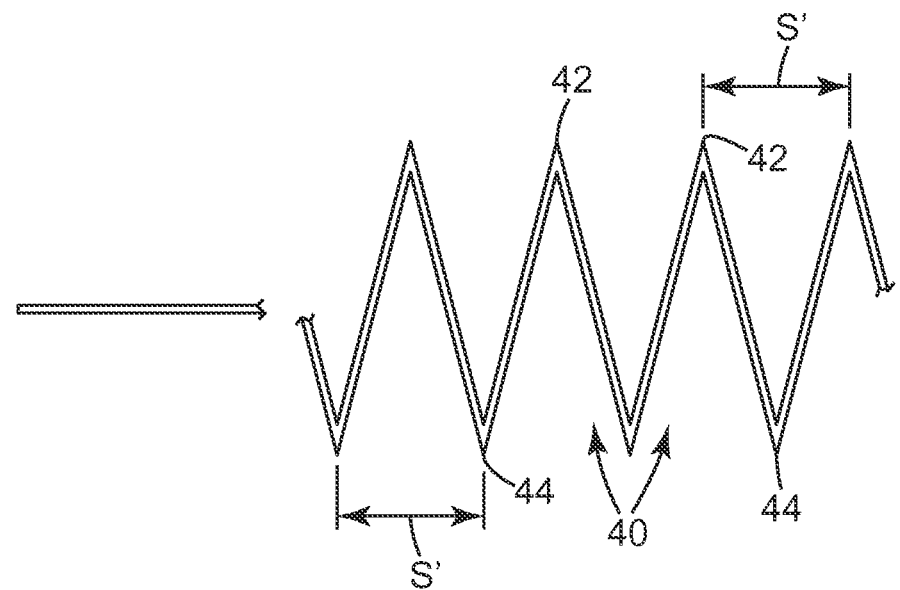
FIG. 2B is an enlarged side view of a filter media web and illustrating pleats formed in the filter media at a pleat spacing differing from a pleat spacing of FIG. 2A.

Various pleat-related terminology is used throughout this disclosure in describing operation of the system 10, and in particular a configuration and operation of the pleat spacing station 14. An initial explanation of the pleat-related terms is provided with reference to pleats formed in the filter media 16 as shown in FIG. 2A. The filter media 16 can initially be provided to the pleating station 12 (FIG. 1) in a planar form (the planar segment 20 in FIG. 2A), and defines opposing, first and second major faces 30, 32. A plurality of pleats 40 are formed in the filter media 16 by a plurality of fold lines that alternately constitute pleat tips 42 and pleat valleys 44. Each fold line is intermediate oppositely sloping walls 46. A "pleat density" of the filter media 16 is in reference to the number of pleats 40 per unit length. Pleat spacing directly relates to the pleat density, and is conventionally defined as the space or distance S between adjacent ones of the pleat valleys 44 (or between adjacent ones of the pleat tips 42). By way of comparison, FIG. 2B illustrates an alternative pleating arrangement formed in the filter media 16. The pleat spacing S associated with the pleat arrangement of FIG. 2A is less than the pleat spacing S' of FIG. 2B, thus the pleat density of FIG. 2A is greater than the pleat density of FIG. 2B. As a point of reference, FIGS. 2A and 2B are generic representations of pleating arrangements that may exist, with the pleat-related terminology being applicable to the pleated filter segment 24 (FIG. 1) and the gathered pleated segment 22 (FIG. 1).

With the above explanations of pleat density and pleat spacing in mind, and returning to FIG. 1, the gathered pleated segment 22 exiting the pleating station 12 has a relatively small pleat spacing. In this regard, the pleating station 12 can assume various forms known in the art and in one embodiment includes a rotary-score pleater 50 that scores the filter media 16 at regularly spaced intervals with a conventional scorer for example. The scored filter media continues to a pleat folder 52 and then an accumulator 54 as known in the art. The accumulator 54 defines an exit side 56 of the pleating station 12. Back pressure may be applied to the gathered pleated segment 22 to stabilize the pleats 40 and tends to fully compress the pleats 40. Radiant heat may be applied to the pleat tips 42 to partially "set" the pleat tips 42 in the gathered pleated segment 22, thereby minimizing the likelihood that the pleats 40 will "spring out" when unconstrained.

The pleat spacing station 14 is generally configured to expand the pleats 40 in the gathered pleated segment 22, establishing an increased pleat spacing, with this established pleat spacing (and thus pleat density) being set into the filter media 16 (i.e., the pleated filter segment 24). Further, the particular pleat spacing (and thus pleat density) effectuated by the pleat spacing station 14 is variable, and can be readily selected and changed by an operator.

In one embodiment, the pleat spacing station 14 includes a lower conveyor 60, an optional upper conveyor 62, and a controller 64. The lower conveyor 60 serves as or defines an entrance side 66 of the pleat spacing station 14 at which the gathered pleated segment 22 exiting the pleating station 12 is received. The upper conveyor 62 is located opposite the lower conveyor 60 at a location downstream of the entrance side 66. A gap G is established between the conveyors 60, 62, sized to interface with the pleated filter segment 24 for example in a nip-type fashion. In some embodiments, the pleat spacing station 14 is configured to permit user adjustment of the gap G, for example by manually or automatically raising or lowering the upper conveyor 62 relative to the lower conveyor 60. Finally, the controller 64 controls a conveyor rate of the conveyors 60, 62.

The lower conveyor 60 can assume a variety of forms, and in some embodiments, includes first and second lower conveyor sections 70, 72. For reasons made clear below, a break or space B can be created between the lower conveyor sections 70, 72. In other embodiments, the lower conveyor 60 can be a single, continuous conveyor. Regardless, the lower conveyor 60 can be a continuous belt-type conveyor. With the embodiment of FIG. 1 in which the lower conveyor 60 is split into the first and second sections 70, 72, a continuous belt of the first section 70 is identified as the belt 80, whereas the second section 72 includes a continuous belt 82. A drive mechanism or motor (not shown) operates to drive or move the conveyor belts 80, 82 at a speed or conveyor rate as dictated by the controller 64.

Where provided, the upper conveyor 62 can also assume a variety of forms, and generally includes a continuous belt 90 and various mechanisms maintaining the belt 90 such that when driven by a motor (not shown) or other drive device, the belt 90 is caused to move at a selected speed or conveyor rate as dictated by the controller 64. As made clear below, pleat spacing adjustment is primarily achieved by the lower conveyor 60 such that in other embodiments, the upper conveyor 62 can be omitted.

The belts 80, 82, 90 associated with the lower and upper conveyors 60, 62 can assume various forms appropriate for interfacing or contacting the filter media 16 in a non-damaging fashion. The belts 80, 82, 90 can be formed of rubber, silicone, polymer, etc. Regardless, the upper and lower conveyors 60, 62 do not include flites, cleats, studs, or any other body projecting outwardly from the corresponding belt 80, 82, 90 as otherwise employed with conventional cleat-type pleat spacers. Moreover, the pleat spacing station 14 does not include a helical screw or similar conveyor format employed with conventional screw-type pleat spacers. Instead, the pleat spacing station 14 effectuates desired pleat adjustment and setting by contacting only the lower-most surface (and optionally the upper-most surface) of the filter media 16, and by controlling the conveyor rate of the lower and upper conveyors 60, 62.

The controller 64 is or includes a computer or other programmable logic machine programmed to operate the lower and upper conveyors 60, 62 at an identical speed or conveyor rate, and to allow a user to select a desired speed and/or to alter a current speed setting. As made clear below, the conveyor rate established at the lower and upper conveyors 60, 62 as part of a pleat spacing automated manufacturing step is based, at least in part, upon a rate at which the gathered pleated segment 22 is being fed from the pleating station 12 to the pleat spacing station 14 and/or the pleat spacing of the gathered pleated segment 20. In particular, and with reference to FIG. 3, the pleating station 12 includes the accumulator 54 at which the gathered pleated segment 22 accumulates following pleat formation. The accumulator 54 includes a conveyance apparatus 100 (referenced generally) that guides the gathered pleated segment 22 toward the entrance side 66 of the pleat spacing station 14. The conveyance apparatus 100 can assume a variety of forms and in some embodiments is akin to a flat plate or a trough having a flat surface along which the pleat valleys 44 of the gathered pleated segment 22 can easily slide. With this construction, a conveying rate of the conveyance apparatus 100 is simply the rate at which the gathered pleated segment 22 exits the pleat folder 52 (FIG. 1) or other pleating station device immediately upstream of the conveyance apparatus 100. Alternatively, the conveyance apparatus 100 can be configured to positively move the gathered pleated segment 22 (e.g., the conveyance apparatus 100 can be or include a driven conveyor belt). Regardless, a conveyor rate of the pleat spacing station lower conveyor 60 is correlated with the conveying rate of the pleating station conveyance apparatus 100 such that as the gathered pleated segment 22 continuously accumulates at the accumulator 54, the lower conveyor 60 continuously "pulls" the filter media web 16 from the accumulator 54.

Figure 3:
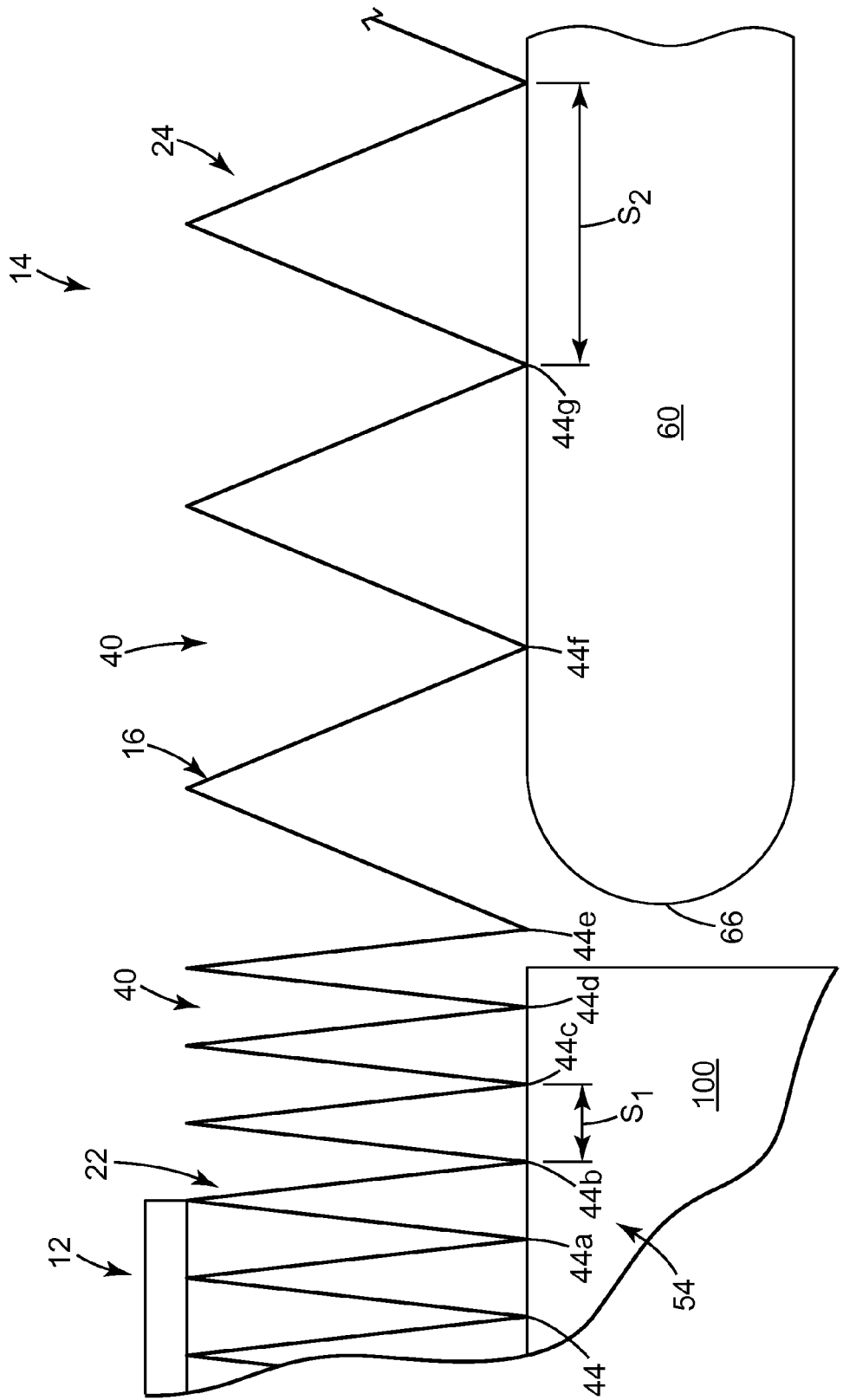
FIG. 3 is an enlarged, simplified side view of a portion of the system of FIG. 1, including a portion of the pleat spacing station operating to adjust pleats in a continuous web of filter media from a first pleat spacing to a second pleat spacing.

For example, FIG. 3 illustrates that the gathered pleated segment 22 at the accumulator 54 has a first or maximum pleat spacing $S_1$ (it being understood that the pleat spacing $S_1$ is exaggerated in the views for ease of explanation). As a point of reference, depending upon a configuration of the pleating station 12, the pleat spacing $S_1$ along the gathered pleated segment 22 can be, but is not necessarily, uniform; regardless, the maximum pleat spacing $S_1$ exists. As the gathered pleated segment 22 is continuously fed to the lower conveyor 60 of the pleat spacing station 14, individual pleat valleys 44 contact or are engaged by the lower conveyor 60. The view of FIG. 3 represents a single point in time during continuous movement of the filter media 16 from the pleating station 12 to (and through) the pleat spacing station 14. With this in mind, FIG. 3 identifies consecutive pleat valleys 44a-44g. At the point in time of FIG. 3, the sixth and seventh pleat valleys 44f, 44g are in contact with the lower conveyor 60 (with the seventh pleat valley 44g being downstream of the sixth pleat valley 44f; in other words, the sixth pleat valley 44f has just come into contact with the lower conveyor 60). The remaining pleat valleys 44a-44e are upstream of the lower conveyor 60. As illustrated, engagement by the lower conveyor 60 transitions the gathered pleated segment 22 into the pleated filter segment 24, with the pleated filter segment 24 having a pleat spacing $S_2$ that is greater than the gathered pleated segment pleat spacing $S_1$. More particularly, the conveyor rate of the lower conveyor 60 is greater or faster than the conveyance rate of the pleating station 12 such that as each consecutive pleat valley 44 contacts the lower conveyor 60, that pleat valley 44 is pulled away from (in the downstream direction) the immediately-preceding pleat valley 44. For example, FIG. 3 illustrates that the sixth pleat valley 44f has been pulled away from (in the downstream direction) the fifth pleat valley 44e. While the fifth pleat valley 44e is not yet in contact with the lower conveyor 60, the elevated speed of the lower conveyor 60 (as compared to the conveyance rate of the pleating station 12) pulls the sixth pleat valley 44f away from the fifth pleat valley 44e. This pulling action may slightly affect one or more of pleats 40 of the gathered pleated segment 22 immediately upstream of the lower conveyor 60. The spacing between the fourth and fifth pleat valleys 44d, 44e may be slightly greater than the spacing between the first—third pleat valleys 44a-44c. However, the adjusted pleat spacing $S_2$ effectuated by the pleat spacing station 14 is greater than the maximum pleat spacing $S_1$ exhibited by at least a majority of the gathered pleated segment 22 along the accumulator 54.

Figure 4B:
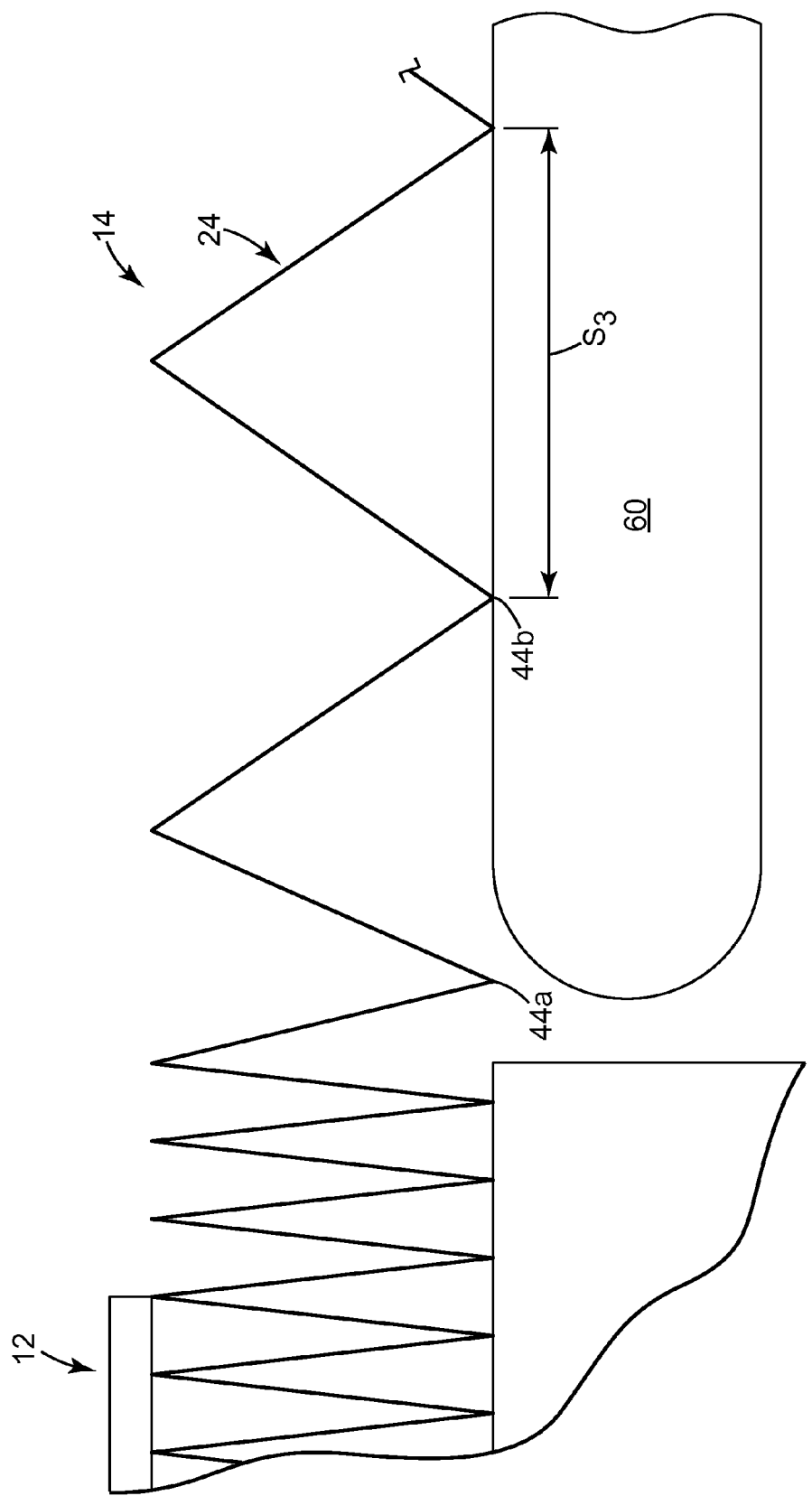
FIG. 4B illustrates the arrangement of FIG. 3 at a later point in time and with the pleat spacing station having been operated at a different conveyor rate to adjust the pleats of the filter media to a third pleat spacing.

By operating the lower conveyor 60 at a uniform rate, the adjusted pleat spacing $S_2$ (and thus pleat density) effectuated by the pleat spacing station 14 is substantially uniform along the continuously moving pleated filter segment 24. For example, FIG. 4A illustrates the construction of FIG. 3 at a later point in time and with the lower conveyor 60 having continued to operate at the same speed. As shown, the second—fourth pleat valleys 44b-44d are now engaged with the lower conveyor 60, and the corresponding pleats 40 in the pleated filter segment 24 exhibit the adjusted pleat spacing $S_2$. Alternatively, FIG. 4B illustrates the arrangement of FIG. 3 at a later point in time but with the lower conveyor 60 having been operated at an elevated conveyor rate or speed (as compared to the conveyor rate that resulted in the arrangement of FIG. 4A). As shown, the pleat spacing station 14 still effectuates an adjustment in the pleat spacing to an increased spacing $S_3$; however, because the lower conveyor 60 is operating at an elevated conveyor rate (as compared to the conveyor rate associated with the example of FIG. 4A), the adjusted pleat spacing $S_3$ is greater than the adjusted pleat spacing $S_2$ of FIG. 4A. As a point of reference, the adjusted pleat spacing $S_3$ represents a lesser pleat density than the pleat density of FIG. 4A. Conversely, operating the lower conveyor 60 at a slower rate will result in a decrease in the pleat spacing effectuated along the pleated filter segment 24.

In light of the above, and returning to FIG. 1, the pleat spacing station 14 of the present disclosure, and corresponding methods associated therewith, allows a user to select and alter, on the fly, the pleat spacing effectuated by the pleat spacing station 14 along the pleated filter segment 24. The controller 64 is prompted by the user to operate the lower conveyor 60 (and thus the upper conveyor 62 where provided) at a conveyor rate commensurate with the desired pleat spacing. Where an increased pleat spacing (or decreased pleat density) is desired, the conveyor rate is increased, whereas the selected conveyor rate is decreased to effectuate a decrease in the pleat spacing generated by the pleat spacing station 14. A user seeking to alter a current "setting" of the pleat spacing station 14 (i.e., change the pleat spacing or pleat density currently being generated by the pleat spacing station 14 to a different pleat spacing or pleat density) need only operate the controller 64 to effectuate a desired change in the conveyor rate; the structure of the pleat spacing station 14 remains the same. While the gap G may be adjusted, such as by raising or lowering the upper conveyor 60, to accommodate a large change in pleat spacing (that in turn requires a large change in a geometry of the pleat depth), the conveyors 60, 62 are not physically altered. In fact, the conveyors 60, 62 can continue to operate while the pleat spacing "setting" of the pleat spacing station 14 is adjusted. By way of example, the system 10 can continuously process the web of filter media 16 as the pleat spacing setting of the pleat spacing station 14 is adjusted. While the pleating station 12 continuously generates the gathered pleating segment 22, the conveyor rate of the pleat spacing station 14 can be adjusted and the pleat spacing being effectuated by the pleat spacing station 14 at the pleated filter segment 24 is altered accordingly. Thus, the pleat spacing of the of system 10 can be adjusted "on the fly", for example adjusting a pleat spacing in a continuous length of the pleated filter segment 24 from a pleat density of less than 4.0 pleats/inch to a pleat density of at least 4.5 pleats/inch (and vice-versa). In other embodiments, pleat spacing adjustments are achieved by altering the conveyance rate of the conveyance apparatus 100 (FIG. 3) while the conveyor rate of the pleat spacing station 14 (e.g., the lower conveyor 60) remains constant.

The conveyor rate of the pleating station 12 can be set to generate a pleat spacing as desired over a wide range of pleat densities. The pleat spacing associated with the pleats 40 of the pleated filter segment 24 corresponds with a pleat density that is typically about 3 to about 6 pleats per 2.54 centimeters (1 inch). Pleat depth and thickness of the pleated filter segment 24 is typically about 2.54 centimeters to about 10.16 centimeters (1 inch to 4 inches). While the pleat tips 42 and the pleat valleys 44 are illustrated with sharp folds, it is also contemplated that they may instead constitute more curved configurations, leading to a sinusoidal shaped pleating of the filter media 16.

In addition to adjusting the pleat spacing of the gathered pleated segment 22 to the pleated filter segment 24, the pleat spacing station 14 is configured to set the so-adjusted pleat spacing into the filter media 16. In this regard, the pleat spacing station 14 can incorporate or accommodate various laminating and/or reinforcing techniques commonly employed. For example, a first reinforcing material 110 is applied to the pleat tips 42 along the first face 30 (FIG. 2A) at the pleat spacing station 14. Depending upon a format of the first reinforcing material 110 (described below), the first reinforcing material 110 is provided in a roll 112, and can be coated with an adhesive, such as by a coating roller 114. Regardless, the first reinforcing material 110 is applied between the pleat tips 42 and the upper conveyor 62 in a continuous fashion.

Similarly, a second reinforcing material 120 can be applied to the pleat valleys 44 along the second face 32 (FIG. 2A) at the pleat spacing station 14. The second reinforcing material 120 can assume various forms (described below), and can be provided in a roll 122. The second reinforcing material 120 is unwound from the roll 122, optionally coated with an adhesive by a coating roller 124, and then fed between the first and second sections 70, 72 of the lower conveyor 60 and the pleat valleys 44.

The pleat spacing station 14 can employ alternative configurations for applying one or both of the reinforcing materials 110, 120. For example, the second reinforcing material 120 can be applied at the first lower conveyor segment 70 (such that the break B in the lower conveyor 60 can be omitted). Further, the first and second reinforcing materials 110, 120 can be introduced at the same location and applied simultaneously. In yet other embodiments, a break can be defined along the upper conveyor 62 and through which the first reinforcing material 110 extends.

The first and second reinforcing materials 110, 120 can assume various forms, and may or may not be identical. In some embodiments, one or both of the first and second reinforcing materials 110, 120 is an elongated planar reinforcing strip. In other embodiments, one or both of the first and second reinforcing materials 110, 120 is a scrim. The reinforcing materials 110, 120 can be constructed from various paperboard products, polymeric materials such as films, or metals configured as elongated strips, scrims, strands or filaments. A scrim refers to a porous mesh, netting or screen. The scrim can be constructed from various metals, plastics or paper-based products. While the first and second reinforcing materials 110, 120 have been described as being bonded to the pleats 40 by adhesive bonding, other techniques are also acceptable including, but not limited to, thermal bonding, solvent bonding, or ultrasonic bonding. The reinforcing materials 110, 120 provide dimensional stability to the pleats 40 of the pleated filter segment 24.

Regardless of whether one or both of the first and second reinforcing materials 110, 120 are applied, the pleated filter segment 24 includes the pleats 40 being set at the pleat spacing effectuated by the pleat spacing station 14. Additional stations can be provided with the system 10 downstream of the pleat spacing station 14. For example, FIG. 1 illustrates an optional cutting station 130. The cutting station 130 can assume various forms, and in some embodiments is a guillotine cutter used to cut the pleated filter segment 24 into pieces that are the length (or width) of the final pleated filter. Other stations conventionally employed with pleated filter manufacture, such as one or more stations that apply a frame about a perimeter of the cut pleated filter segment, are also envisioned.

As described above, various reinforcing members (e.g., the reinforcing materials 110, 120) can be applied to the pleated filter media 16. Conventionally, a galvanized wire mesh employed as one or both of the reinforcing materials 110, 120 is known, as are paperboard strips and/or glue beads. In other optional embodiments of the present disclosure, one or both of the reinforcing materials 110, 120 is a polymeric strap, such as a polypropylene strap or a woven polyester strap. The polymeric strapping material is safer and more convenient to handle than galvanized wire, and is easier to dispose of at end-of-life. Further, conventional strapping materials are designed to exhibit high tensile strength at low weights. For example, ¼ inch wide polypropylene straps are rated at 200 pounds of tension. Further, a color of the strapping material can be selected by the end user as desired, and in some embodiments can be formulated to "look" like glue beads conventionally employed for pleat pack stabilization.

The systems and methods of the present disclosure can be employed with various filter media constructions. For example, the filter media 16 can be paper, porous films of thermoplastic or thermoset materials, non-woven webs of synthetic or natural fibers, scrims, woven or knitted materials, foams, or electret or electrostatically charged materials. The filter media 16 may also include sorbents, catalysts, and/or activated carbon (granules, fibers, fabric, and molded shapes). Electret filter webs can be formed of the split fibrillated charged fibers as described in U.S. Patent No. RE 30,782, the teachings of which are incorporated herein by reference. The charged fibers can be formed into a non-woven web by conventional means and optionally joined to a supporting scrim such as disclosed in U.S. Pat. No. 5,230,800, the teachings of which are incorporated herein by reference, forming an outer support layer. Alternatively, the filter media 16 can be a melt blown microfiber non-woven web, such as disclosed in U.S. Pat. No. 4,817,942, the teachings of which are incorporated herein by reference, which can be joined to a support layer during web formation as disclosed in that patent, or subsequently joined to a support web in any conventional manner.

A particularly suitable media is a corona-treated spunbond polyethylene/polypropylene twinned fiber, commercially available from Kimberly Clark Corporation under the designation Accuair. Another suitable media is a blown polypropylene microfiber having a basis weight of about 10 g/m$^2$ to about 120 g/m$^2$ and an average filament diameter of about 2 micrometers to about 17 micrometers. Laminated media can also be used as the filter media 16. Such media may consist of laminated layers of the media discussed above or of other substrates laminated to one or more layers of filter media, for example.

Although the present invention has been described with reference to preferred embodiments, workers skilled in the art will recognize that changes can be made in form and detail without departing from the spirit and scope of the present invention.

What is claimed is:

1. A method of forming a framed pleated filter, the method comprising:
   operating a lower conveyor of a pleat spacing station at a selected conveyor rate and operating an upper conveyor of the pleat spacing station at the same selected conveyor rate, wherein the lower conveyor extends upstream of the upper conveyor,
   receiving a gathered pleated segment of a web of filter material at the pleat spacing station, the gathered pleated segment having a plurality of pleats including a plurality of pleat tips and a plurality of pleat valleys, and arranged in a first configuration defined by a maximum first distance between adjacent pleat tips;
   adjusting and setting the arrangement of the plurality of pleat tips within the pleat spacing station into a second spaced configuration defined by a second distance between adjacent pleat tips to form a pleated filter segment with a pleat spacing defined by the second distance between adjacent pleat tips, wherein the second distance is greater than the first distance and varies as a function of the selected conveyor rate;
      wherein the step of adjusting and setting the plurality of pleats within the pleat spacing station includes disposing a first reinforcing material between the upper conveyor and the pleat tips to apply the first reinforcing material to the pleat tips and bonding the first reinforcing material to the pleat tips, so that the first reinforcing material provides dimensional stability to the pleats of the pleated filter segment,
   and,
   securing the pleated filter segment within a perimeter frame to provide a framed pleated filter comprising the pleated filter segment that exhibits the pleat spacing defined by the second distance between adjacent pleat tips.

2. The method of claim 1, wherein the pleat spacing station is configured to selectively operate the lower conveyor at a first conveyor rate and a second conveyor rate, the first conveyor rate being different from the second conveyor rate, and further wherein the second distance at the first conveyor rate is different from the second distance at the second conveyor rate.

3. The method of claim 2, wherein the second distance at the first conveyor rate corresponds with a pleat density of not less than 4.5 pleats per inch, and the second distance at the second conveyor rate corresponds with a pleat density of not greater than 4.0 pleats per inch.

4. The method of claim 1, wherein the step of operating the lower conveyor includes:
   determining a desired pleat spacing of the pleated filter media; and
   selecting the conveyor rate as a function of the desired pleat spacing.

5. The method of claim 1, wherein the step of adjusting and setting the arrangement of the plurality of pleat tips within the pleat spacing station includes:
   operating the lower conveyor at a first conveyor rate for a first period of time to generate a first portion of pleated filter media having a first spacing between adjacent pleat tips; and
   operating the lower conveyor at a second conveyor rate differing from the first conveyor rate for a second period of time to generate a second portion of pleated filter media having a second spacing between adjacent pleat tips;
   wherein the second spacing is different from the first spacing.

6. The method of claim 5, wherein the steps of operating the lower conveyor at the first conveyor rate and the second conveyor rate includes the gathered pleated segment being continuously supplied to the pleat spacing station.

7. The method of claim 6, wherein the method is characterized by the lower conveyor continuing to move while transitioning from the first conveyor rate to the second conveyor rate.

8. The method of claim 1, wherein the step of adjusting and setting the arrangement of pleat tips in the pleat spacing station is characterized by the absence of inserting a body in between adjacent pleat tips.

9. The method of claim 1, wherein the pleat spacing station is characterized by the absence of cleats carried by the lower conveyor.

10. The method of claim 1, further comprising:
    prior to the step of receiving a gathered pleated segment, forming the gathered pleated segment from a generally planar segment of the web of filter material at a pleating station;
       wherein the pleating station includes a pleat station conveyance apparatus for advancing the gathered pleated segment from the pleating station to the pleat spacing station;
       and further wherein the selected conveyor rate of the pleat spacing station is correlated with a conveyance rate of the conveyance apparatus.

11. The method of claim 10, wherein the upper conveyor is located above a segment of the lower conveyor.

12. The method of claim 11, wherein the step of adjusting and setting the arrangement of the plurality of pleat tips within the pleat spacing station includes initially contacting the web of filter material only with the lower conveyor at a location upstream of the upper conveyor, and further wherein the conveyance rate of the pleat station conveyance apparatus and the conveyor rate of the pleat spacing station is such that a continuous supply of the gathered pleated segment is fed to the lower conveyor.

13. The method of claim 1, wherein the lower conveyor includes a first conveyor section and a second conveyor section, the first conveyor section defining an entrance side of the pleat spacing station, and further wherein the upper conveyor is aligned with the second conveyor section downstream of the first conveyor section.

14. The method of claim 13, wherein the step of adjusting and setting the arrangement of the plurality of pleats within the pleat spacing station includes:
   initially contacting the pleat valleys at the first conveyor section of the lower conveyor to cause the pleats in the gathered pleated segment to pull apart to the second distance; and
   subsequently engaging the plurality of pleats between the upper conveyor and the second conveyor section of the lower conveyor.

15. The method of claim 14, wherein the first conveyor section, the second conveyor section, and the upper conveyor are operated at an identical conveyor rate.

16. The method of claim 14, wherein the step of adjusting and setting the plurality of pleats within the pleat spacing station further includes:
   disposing a second reinforcing material between the second conveyor section of the lower conveyor and the pleat valleys to apply the second reinforcing material to the pleat valleys.

17. The method of claim 1, wherein the first reinforcing material is a polymer strapping material.

18. The method of claim 17, wherein the polymer strapping material is selected from the group consisting of polypropylene and woven polyester.

19. The method of claim 1 wherein the first reinforcing material comprises metal configured as elongated strips, scrims, strands or filaments.

20. The method of claim 1, wherein the lower conveyor includes a first conveyor section and a second conveyor section, the first conveyor section defining an entrance side of the pleat spacing station, and further wherein the upper conveyor consists of a single conveyor section.

* * * * *

UNITED STATES PATENT AND TRADEMARK OFFICE
CERTIFICATE OF CORRECTION

Page 1 of 1

PATENT NO. : 9,808,753 B2
APPLICATION NO. : 14/177900
DATED : November 7, 2017
INVENTOR(S) : Jonathan Lise et al.

It is certified that error appears in the above-identified patent and that said Letters Patent is hereby corrected as shown below:

In the Specification

<u>Column 7</u>
Line 23, Delete "of the of" and insert -- of the --, therefor.

In the Claims

<u>Column 9</u>
Line 39, In Claim 1, delete "conveyor," and insert -- conveyor; --, therefor.

Signed and Sealed this
Twenty-eighth Day of May, 2019

Andrei Iancu
*Director of the United States Patent and Trademark Office*